United States Patent
Jain

(10) Patent No.: US 6,916,359 B2
(45) Date of Patent: Jul. 12, 2005

(54) OZONE PRODUCTION PROCESSES

(75) Inventor: Ravi Jain, Bridgewater, NJ (US)

(73) Assignee: The BOC Group, Inc., Murray Hill, NJ (US)

(*) Notice: Subject to any disclaimer, the term of this patent is extended or adjusted under 35 U.S.C. 154(b) by 1 day.

(21) Appl. No.: 10/419,395

(22) Filed: Apr. 21, 2003

(65) Prior Publication Data

US 2004/0028576 A1 Feb. 12, 2004

Related U.S. Application Data

(60) Provisional application No. 60/375,560, filed on Apr. 25, 2002.

(51) Int. Cl.$^7$ ............................................. B01D 53/047
(52) U.S. Cl. ............................... 95/99; 95/105; 95/106; 95/119; 95/122; 95/138; 95/139
(58) Field of Search ..................... 95/96–106, 117–119, 95/121, 122, 138, 139

(56) References Cited

U.S. PATENT DOCUMENTS

| | | | |
|---|---|---|---|
| 2,872,297 A | 2/1959 | Dugan | |
| 2,872,397 A | 2/1959 | Kiffer | |
| 3,963,625 A | 6/1976 | Lowther | 250/533 |
| 4,140,608 A | 2/1979 | Vaseen | 204/176 |
| 4,453,953 A | 6/1984 | Tanaka et al. | 55/163 |
| 4,604,279 A | 8/1986 | Leitzke et al. | 423/581 |
| 5,039,314 A | 8/1991 | Lehner et al. | |
| 5,100,521 A | 3/1992 | Schwarzl | 204/176 |
| 5,275,742 A | 1/1994 | Satchell, Jr. et al. | |
| 5,507,957 A | 4/1996 | Garrett et al. | |
| 5,520,887 A | 5/1996 | Shimizu et al. | |
| 5,624,734 A | 4/1997 | Rees et al. | 422/186.11 |
| 5,688,367 A | 11/1997 | Hornsey et al. | 162/38 |
| 5,730,783 A * | 3/1998 | Sanui et al. | 95/115 |
| 5,756,054 A | 5/1998 | Wong et al. | 422/186.08 |
| 5,785,738 A * | 7/1998 | Gastiger et al. | 95/12 |
| 5,810,910 A | 9/1998 | Ludwig et al. | |
| 5,837,036 A * | 11/1998 | Schleicher et al. | 95/138 |
| 5,846,298 A | 12/1998 | Weist, Jr. | |
| 5,853,457 A * | 12/1998 | Eysmondt et al. | 95/138 |
| 5,888,271 A | 3/1999 | Tanimura et al. | |
| 6,022,456 A | 2/2000 | Manning | 204/176 |
| 6,030,598 A | 2/2000 | Topham et al. | |
| 6,083,464 A | 7/2000 | Tanimura et al. | 422/186.08 |
| 6,197,091 B1 | 3/2001 | Ji et al. | 95/45 |
| 6,254,763 B1 | 7/2001 | Izumi et al. | |
| 6,270,557 B1 * | 8/2001 | Millet et al. | 95/96 |
| 6,309,521 B1 | 10/2001 | Andrews et al. | 204/252 |
| 6,315,861 B1 | 11/2001 | Joseph et al. | |
| 6,315,962 B1 | 11/2001 | Tanimura et al. | 422/186.07 |
| 6,333,017 B1 | 12/2001 | Conrad et al. | 423/581 |
| 6,344,130 B1 | 2/2002 | Koike et al. | 205/626 |
| 6,426,053 B1 | 7/2002 | Barnes | 422/186.3 |
| 6,432,279 B1 | 8/2002 | Zanta | 204/157.5 |
| 6,533,999 B1 * | 3/2003 | Izumi et al. | 422/4 |
| 2001/0022135 A1 * | 9/2001 | Murai | 95/138 |

FOREIGN PATENT DOCUMENTS

| | | |
|---|---|---|
| EP | 0 564 107 | 10/1993 |
| EP | 0 876 994 A1 | 11/1998 |
| FR | 2 783 817 A1 | 9/1998 |

OTHER PUBLICATIONS

European Search Report, Aug. 20, 2003 Searched in Berlin/ Examiner J. Cubas Alcaraz.

* cited by examiner

Primary Examiner—Robert H. Spitzer
(74) Attorney, Agent, or Firm—Joshua L. Cohen

(57) ABSTRACT

Methods of providing ozone at a selected pressure above atmospheric pressure include supplying a purge gas supply (22) pressurized above the selected pressure to at least one ozone adsorption apparatus (12); desorbing ozone from the ozone adsorption apparatus (12) with the pressurized purge gas supply (22); and delivering a mixture of ozone and the purge gas supply (24) at the selected pressure without further compression.

20 Claims, 7 Drawing Sheets

$O_3$ ABSORPTION-DESORPTION (DRY $N_2$ REGENERATION)

TIME, MINS $O_3$ ABSORPTION-DESORPTION (WET $N_2$ REGENERATION)

TIME, MINS

OZONE PRODUCTION PROCESSES

CROSS REFERENCE TO RELATED APPLICATIONS

This application claims the benefit of the filing date of U.S. Provisional Application Ser. No. 60/375,560, filed Apr. 25, 2002.

FIELD OF THE INVENTION

The present invention relates to providing a supply of ozone.

BACKGROUND

Ozone is widely utilized for processes such as drinking water disinfection, and control of gaseous pollutants such as $NO_x$. However, for large systems, the cost of operating ozone production plants becomes a very large part of the overall system cost. Therefore, various methods for reducing the cost of producing ozone have been implemented. For example, in ozone production plants, ozone-depleted oxygen has been recycled to ozone generators and waste gas from oxygen generators has been used to purge ozone during the pressure swing adsorption process. However, there is need for additional improvements to ozone production plants to reduce the overall system cost of operating production plants used for processes such as drinking water disinfection, waste water treatment, and control of gaseous pollutants such as $NO_x$.

SUMMARY

There is provided, a method of providing ozone at a selected pressure above atmospheric pressure comprising:

supplying a purge gas supply pressurized above the selected pressure to at least one ozone adsorption apparatus;

desorbing ozone from said ozone adsorption apparatus with said pressurized purge gas supply; and delivering a mixture of said ozone and said purge gas supply at the selected pressure without further compression.

In one embodiment, there is provided a method of providing ozone at a selected pressure above atmospheric pressure comprising:

providing a supply of compressed dry air at a pressure above the selected pressure;

diverting a first portion of said compressed dry air supply to an oxygen generator;

generating an oxygen supply with said oxygen generator;

directing said oxygen supply to an ozone generator;

generating an ozone-rich oxygen supply with said ozone generator;

passing said ozone-rich oxygen supply through at least one pressure swing adsorption tower;

adsorbing ozone from said ozone-rich oxygen supply in said pressure swing adsorption tower, to provide an ozone-depleted oxygen supply;

recycling the ozone-depleted oxygen supply to said ozone generator;

diverting a second portion of said compressed dry air supply to said pressure swing adsorption tower;

desorbing said ozone from said pressure swing adsorption tower using said second portion of said compressed dry air supply; and delivering a mixture of said ozone from said pressure swing adsorption tower and said second portion of said compressed air supply at the selected pressure without further compression.

DETAILED DESCRIPTION

Figure 1:
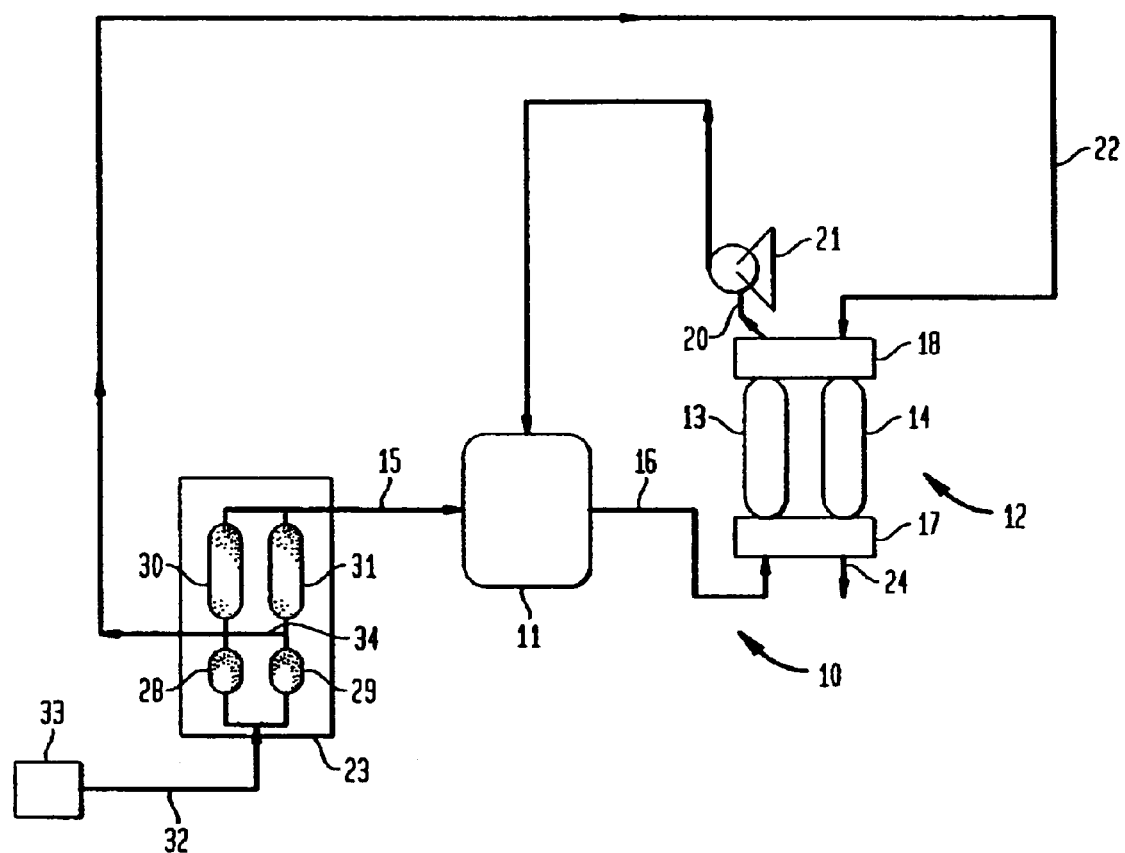
FIG. 1 is a schematic representation of ozone production plant having an oxygen generator using nitrogen adsorption beds to generate an oxygen supply and dryer beds to generate a compressed dry air supply.

A method is provided wherein the operation of ozone production plants are improved. In certain embodiments, the need for additional compression before utilization of a supply mixture of a waste gas and ozone is eliminated. In certain embodiments, various cryogenic oxygen generators, particularly suitable for generating oxygen for use in large ozone use processes may be used. A vaporized liquid oxygen supply may be used to simplify the recycling of an ozone-depleted oxygen supply to the ozone generator. A high purity oxygen supply, rather than the ozone-depleted oxygen supply, may be used during the oxygen purge and pressurization cycles of a pressure swing adsorption process to minimize the build up of inerts such as nitrogen during oxygen recycle. The size of an ozone buffer tank used to reduce pressure fluctuations and concentration fluctuations of ozone may also be reduced. The waste gas supply used during the waste gas purge cycle may be warmed to allow for use of higher pressures during the waste gas purge cycle than afforded during the ozone adsorption cycle. The waste gas supply may remain wet during the waste gas purge cycle to eliminate the need for drying a compressed air supply before use for ozone desorption, and allowing use of adsorbents with higher ozone adsorption capacity.

As shown in the accompanying Figures, a plant for the production of ozone is generally indicated by the numeral 10. In certain of the embodiments of this invention, the ozone production plant 10 has an ozone generator 11 and a two tower pressure swing adsorption (PSA) apparatus or plant 12. The first tower 13 and second tower 14 of the two tower PSA plant 12 each have an adsorption bed (not shown) used for the adsorption and desorption cycles. These adsorption beds may contain adsorbents such as silica gel, high silica mordenites, dealuminated Y zeolite, and other materials that do not destroy a significant amount of ozone. Adsorbents other than silica gel may require some moisture on them to keep ozone destruction below acceptable levels. These adsorbents adsorb and desorb ozone during the process of ozone generation performed by the ozone generation plant 10 described hereinbelow. Furthermore, even though two towers with their adsorption beds are typical for ozone production, additional towers and their corresponding adsorption beds would allow for a more continuous operation of the ozone production plant 10.

Figure 2:
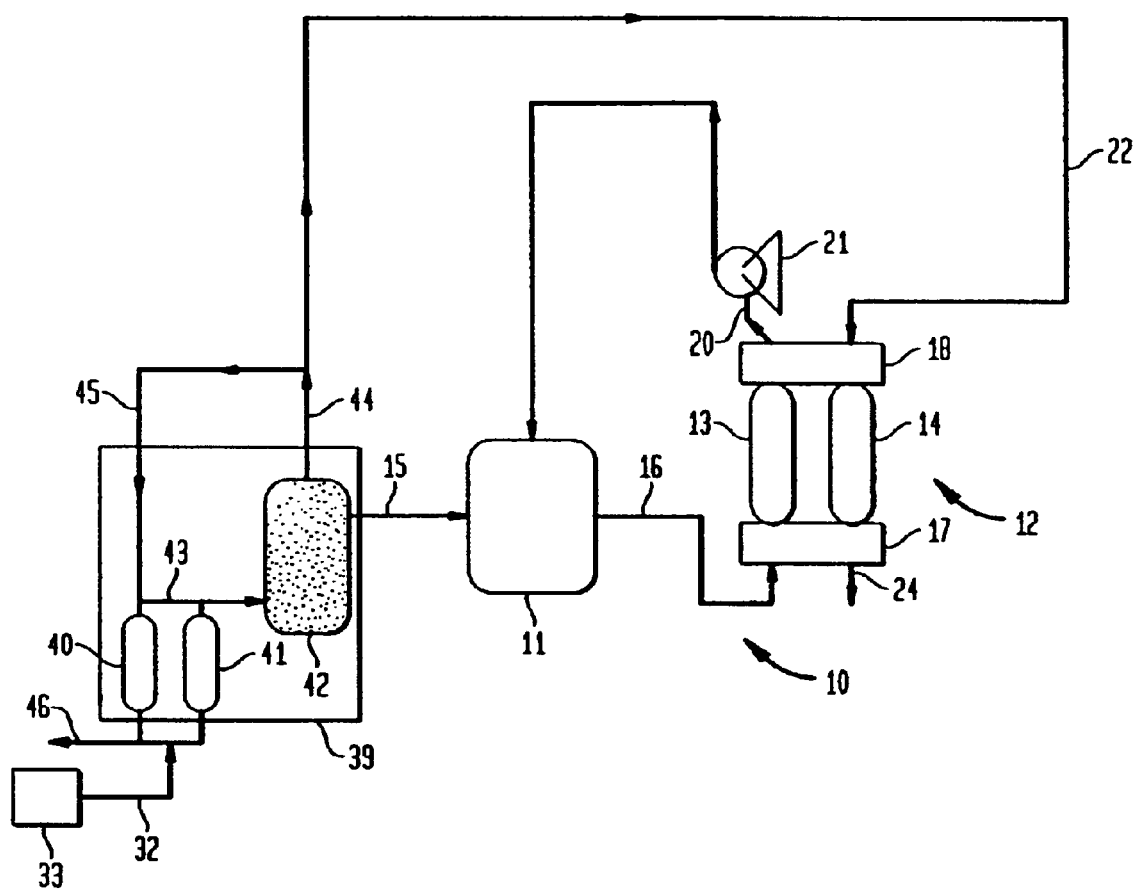
FIG. 2 is a schematic representation of ozone production plant having an oxygen generator using a cryogenic oxygen generator to generate an oxygen supply and a dry nitrogen supply.
Figure 3:
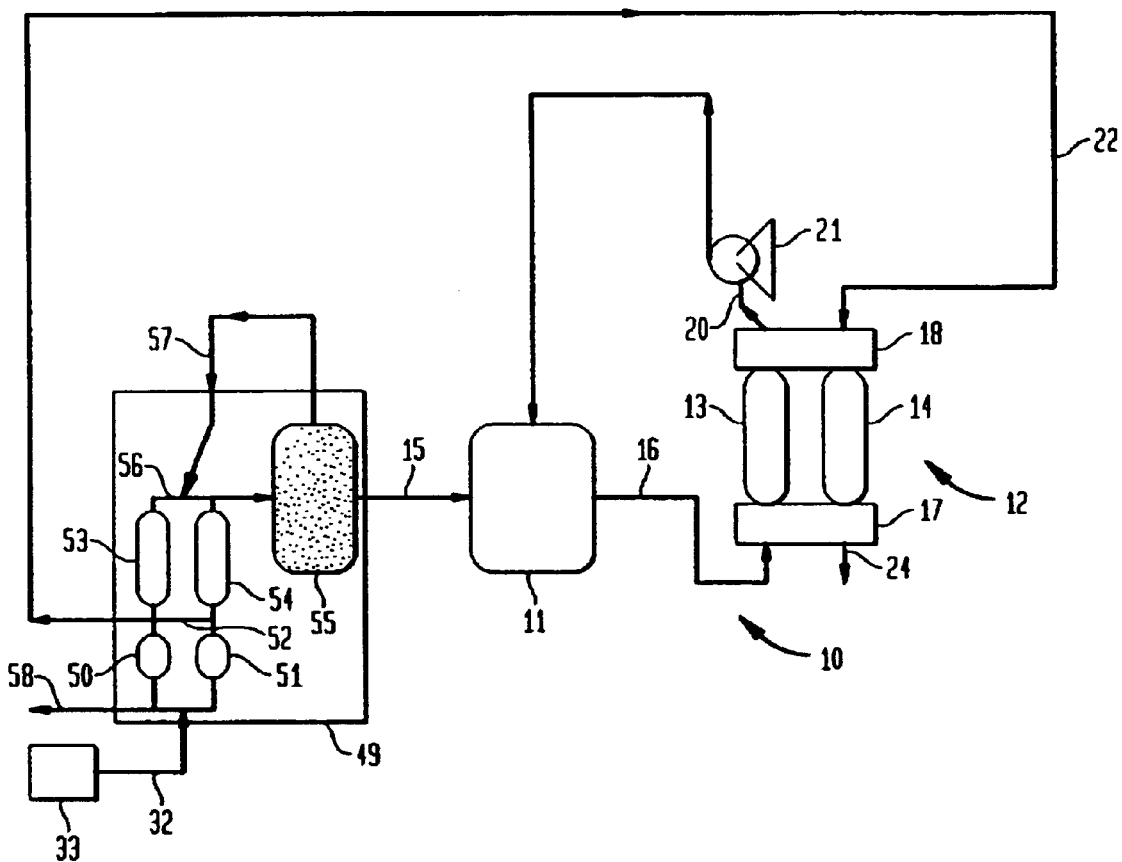
FIG. 3 is a schematic representation of ozone production plant having an oxygen generator using a cryogenic oxygen generator to generate a dry oxygen supply and a compressed dry air supply.

The adsorption beds of the first tower 13 and second tower 14 pass through pressurization, ozone adsorption, waste gas purge (also called ozone desorption and regeneration), and oxygen purge cycles. The two tower PSA plant 12 of FIGS. 1–3 are each configured to facilitate these cycles. For example, the two tower PSA plant 12 is provided with a first switching system 17 and second switching system 18. These switching systems contain various valves that operate to connect and disconnect the first tower 13 or second tower 14 to different gas supplies. The intermittent connection and disconnection of different gas supplies allows the first tower 13 and second tower 14 to operate out of phase with one another. Such a phase difference allows the two tower PSA plant 12 to operate relatively continuously.

For illustrative purposes, but not by way of limitation, the general operation of the ozone production plant 10 as shown in FIGS. 1–3 will be described. An oxygen supply 15 is provided to the ozone generator 11. The ozone generator 11 operates to provide an ozone-rich oxygen supply 16 to the first switching system 17. The ozone-rich oxygen supply 16 is directed by the first switching system 17 to the two tower PSA plant 12.

The first tower 13 and second tower 14 both utilize the ozone-rich oxygen supply 16, and may operate according to the same pressure swing adsorption process. However, the phase difference between either tower dictates that neither are in the same mode of operation at any given time. For example, at a given time, the adsorption bed of the first tower 13 could be undergoing the adsorption cycle, and the adsorption bed of the second tower 14 could be undergoing the waste gas purge cycle. The total time of one cycle of the pressure swing adsorption cycle may range from about 2 to about 30 minutes. For simplicity, the general operation of the first tower 13 is further described below.

To initiate the operation of the first tower 13, the first switching system 17 directs the ozone-rich oxygen supply 16 to the first tower 13 where it is used during the adsorption cycle. The ozone-rich oxygen supply 16 may have a pressure ranging from about 5 to about 50 psig, and the adsorption cycle may be performed at a temperature range from about −50° C. to about 50° C. During the adsorption cycle, the ozone from the ozone-rich oxygen supply 16 is adsorbed by the adsorption beds of the first tower 13. Part of the ozone-depleted oxygen supply 20 is directed by the second switching system 18 to the second tower 14 (for use in the pressure swing adsorption process occurring in the second tower 14) and the remainder is directed to the blower 21. The blower 21 may return a portion of the ozone-depleted oxygen supply 20 to the ozone generator 11 to be recycled.

During the waste gas purge cycle, the ozone adsorbed from the ozone-rich oxygen supply 16 is desorbed from the adsorption beds by a waste (or purge) gas supply 22 (such as either a compressed dry air supply 34, 52 or a nitrogen supply 44). The waste gas supply 22 may have a pressure ranging from about 1 to about 30 psig, and the waste gas purge cycle is performed at a temperature range from about −50° C. to about 100° C. The pressure of waste gas supply 22 is typically lower than the oxygen supply 15 entering the ozone generator, but can be adjusted depending on the needs of the application. Furthermore, the mass flow rate of the waste gas supply 22 can be higher or lower than the ozone-rich oxygen supply 16, however, the relative flow rates must be sufficient to obtain steady state operation of the pressure swing adsorption process. As will be discussed hereinbelow, the waste gas supply 22 may be generated by the oxygen generation apparatus 23, 39, and 49, and may be provided to the first tower 13 by the second switching system 18. The waste gas supply 22 purges the ozone from the first tower 13, and the resulting supply mixture 24 of waste gas and ozone is subsequently directed via the first switching system 17 to the ozone utilization applications, for example, a drinking water disinfection system.

During the oxygen purge and pressurization cycles, the ozone-depleted oxygen supply 20 from the second tower 14 may be directed by the second switching means 18 to the first tower 13. The first tower 13 may be sequentially purged of any excess waste gas supply 22 and pressurized using the ozone-depleted oxygen supply 20. The pressure swing adsorption cycle is subsequently repeated in the first tower 13. Furthermore, the pressure swing adsorption process continues in both the first tower 13 and the second tower 14 during the ozone generation process.

As discussed above, the supply mixture 24 of waste gas and ozone may be directed to drinking water disinfection systems (purification), waste water treatment systems, or $NO_x$ abatement systems. Such drinking water disinfection systems and waste water treatment systems require the supply mixture 24 to be provided at pressures of about 10 to about 25 psig. $NO_x$ abatement systems require ozone supply pressures between 10 and 15 psig. However, additional compression of the supply mixture 24 after exiting the first tower 13 and second tower 14 would require a compressor and the power associated with it, and would lead to loss of ozone. This would be the case if the waste gas from the nitrogen adsorbing beds 30 and 31 in FIG. 1, rather than the compressed dry air supply 34, were used as the waste gas supply 22 for the waste gas purge cycle. In this case, the waste gas from the nitrogen adsorbing beds 30 and 31 would be at close to atmospheric pressure and the supply mixture 24 would be at close to atmospheric pressure and would require compression. The ozone production and methods described above eliminate the need for additional compression of the supply mixture 24, as discussed further below.

In the ozone production plant 10, various oxygen generators 23, 39, and 49 can be used to produce the oxygen supply 15 and the waste gas supply 22. In each of the embodiments of the oxygen generators 23, 39, and 49 shown in FIGS. 1–3, the waste gas supply 22 supplied to the first tower 13 and second tower 14 during the waste gas purge cycle discussed above, is provided at an elevated pressure, sufficient to provide the supply mixture 24 at the desired selected pressure, taking into account the known pressure drops throughout the system. For example, a compressed air supply 32 is initially compressed to the required pressure by a compressor 33. The compressed air supply 32 is delivered to the oxygen generators 23 where the oxygen supply 15 and waste gas supply 22 are produced. The waste gas supply 22 is directed to the first tower 13 and second tower 14, and additional compression is unnecessary because of the initial compression by the compressor 33.

Even though each of the oxygen generators 23, 39, and 49 respectively depicted in FIGS. 1–3 eliminate the need for additional compression of the waste gas supply 22, these oxygen generators operate differently. For example, FIG. 1 depicts an oxygen generator 23 using pressure or vacuum swing adsorption (PSA or VSA) to generate the oxygen supply 15. The oxygen generator 23 is divided into dryer beds 28 and 29 and nitrogen adsorbing beds 30 and 31. The dryer beds 28 and 29 remove moisture from the compressed air supply 32. After exiting the dryer beds 28 and 29, the resulting compressed dry air supply 34 is divided. One part becomes the waste gas supply 22, and the other part is directed to the nitrogen adsorbing beds 30 and 31. The nitrogen adsorbing beds 30 and 31 adsorb nitrogen from the compressed dry air supply 34 to produce the oxygen supply 15.

FIG. 2 shows oxygen production using a cryogenic oxygen generator 39 using air prepurification units 40 and 41 in combination with a cryogenic distillation unit 42. The prepurification units 40 and 41 remove moisture and carbon dioxide from the compressed air supply 32 using either temperature swing adsorption or pressure swing adsorption processes. After being directed to the cryogenic unit 42, the resulting purified air supply 43 is cooled to cryogenic temperatures, and separated into oxygen for use as oxygen supply 15 and a nitrogen supply 44. The nitrogen supply 44 is divided, where one part becomes the waste gas supply 22 discussed above, and the other part becomes a regeneration supply 45 for the air prepurification units 40 and 41. Intermittently, the process in the air prepurification units 40 and 41 is reversed to facilitate regeneration, and the regeneration supply 45 is used to regenerate the air repurification units 40 and 41. After regeneration, the regeneration supply 45 exits the air prepurification units 40 and 41 as exhaust stream 46.

If waste gas supply 22 is required at higher pressures, the cryogenic oxygen generator 39 of FIG. 2 can be modified. As in the case of the oxygen generator 23 of FIG. 1, a separate compressed dry air supply can be produced when oxygen is made using cryogenic distillation. The resulting modified cryogenic oxygen generator 49 is depicted in FIG. 3. In FIG. 3, dryer beds 50 and 51 are used to dry the compressed air supply 32. The resulting compressed dry air supply 52 is divided. One part becomes the waste gas supply 22 as discussed above, and the other part is directed to the air prepurification units 53 and 54. As in FIG. 2, the air prepurification units 53 and 54 of cryogenic oxygen generator 49 of FIG. 3 removes other impurities such as carbon dioxide from the compressed dry air supply 52. Furthermore, after being directed to the cryogenic unit 55, the resulting purified air supply 56 is cooled to cryogenic temperatures, and separated into oxygen for use as oxygen supply 15 and a nitrogen supply 57. The nitrogen supply 57 is used to regenerate the air prepurification units 53 and 54. Intermittently, the process in the air prepurification units 53 and 54 is also reversed to facilitate regeneration, and the nitrogen supply 57 exits the air prepurification units 53 and 54 and dryer beds 50 and 51 as exhaust stream 58.

The general operation of the ozone production plant 10 using the various oxygen generators 23, 39, and 49 as described above eliminates the need for additional compression of the waste gas 22. Furthermore, the cryogenic oxygen generators 39 and 49 are particularly suitable for large ozone use processes. These large use ozone processes include, among others, the $LoTO_x$ process for $NO_x$ abatement. For large ozone users, the oxygen supply 15 generated with the cryogenic oxygen generators 39 and 49 provides a much more cost effective alternative to other forms of oxygen generation.

Figure 4:
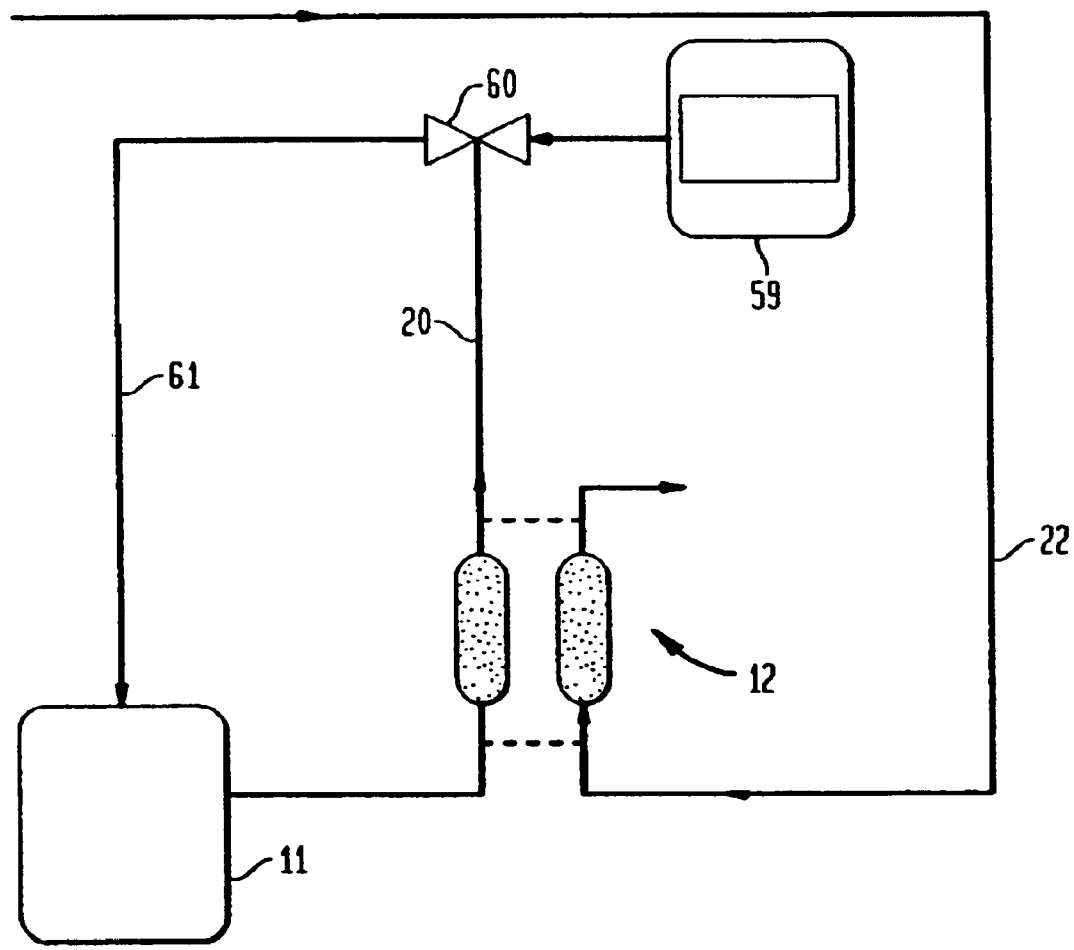
FIG. 4 is a schematic representation of a vaporized liquid oxygen supply for the oxygen purge and pressurization cycles and for compressing the ozone-depleted oxygen supply.

Improvements to the ozone production plant 10 can be used to increase the efficiency of the ozone production process, and further reduce costs. For example, when vaporized liquid oxygen, such as being supplied from a liquid oxygen tank, is used to supply the ozone generator 11 as oxygen supply 15, the vaporized liquid oxygen can also be used to simplify the recycling of the ozone-depleted oxygen supply 20. As seen in FIG. 4, the ozone-depleted oxygen supply 20 and a vaporized liquid oxygen supply 59 with an elevated pressure (up to 200 psig) are directed to an eductor 60. At the eductor 60, the gas supplies are mixed and the ozone-depleted oxygen supply 20 is therefore compressed. The effective compression of the ozone-depleted oxygen supply 20 forces the ozone-depleted oxygen supply 20, as part of a mixed oxygen supply 61, to the ozone generator 11. The effective compression of the ozone-depleted oxygen supply 20 eliminates the need for the blower 21.

Efficiency can also be increased by modifying the pressure swing adsorption process in the two tower PSA plant 12. In other words, the pressure swing adsorption process is not limited to the various cycles described above, and additional or modified cycles can be used to improve efficiency. The pressure swing adsorption process in the two tower PSA plant 12 is described in Table 1 below.

TABLE 1

| Bed of First Tower 13 | Bed of Second Tower 14 | Valves Open | Time (minutes) |
| --- | --- | --- | --- |
| Oxygen purge using ozone-depleted oxygen supply 20 | Ozone adsorption | V2, V3, V5, V6, V10 | 0.25 |
| Pressurization with ozone-depleted oxygen supply 20 | Ozone adsorption | V2, V5, V6, V10 | 0.25 |
| Ozone adsorption | Purge using waste gas 22 | V1, V4, V8, V9 | 4.5 |
| Ozone adsorption | Oxygen purge using ozone-depleted oxygen supply 20 | V1, V4, V5, V6, V9 | 0.25 |
| Ozone adsorption | Pressurization with ozone-depleted oxygen supply 20 | V1, V5, V6, V9 | 0.25 |
| Purge using waste gas 22 | Ozone adsorption | V2, V3, V7, V10 | 4.5 |

Figure 5:
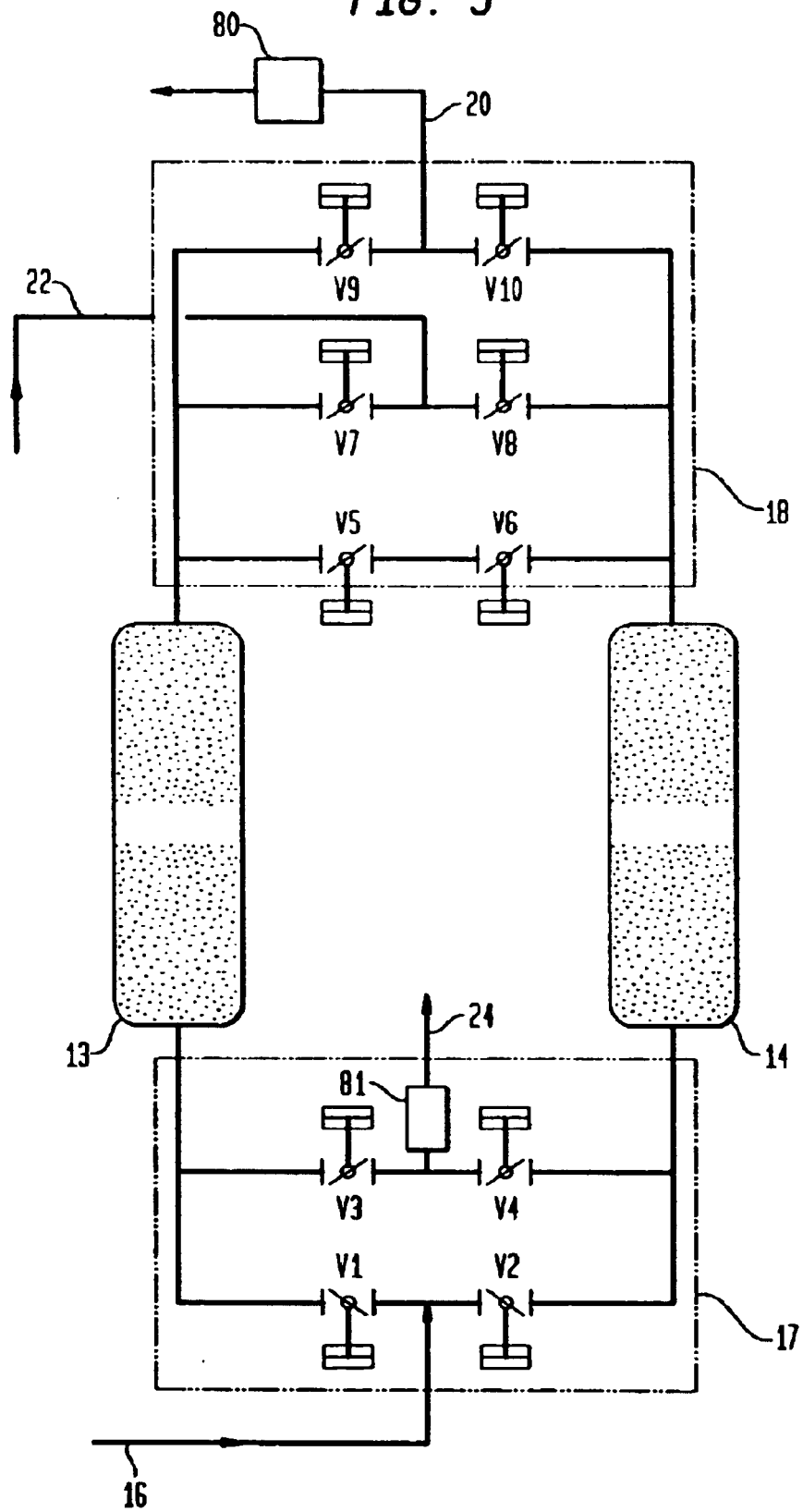
FIG. 5 is a schematic representation of a two tower pressure swing adsorption plant.

FIG. 5 illustrates the configuration of the two tower PSA plant 12 facilitating the various cycles, and details the valves V1–V4 forming the first switching system 17 and the valves V5–V10 forming the second switching system 18. Table 1 refers to the valves V1 through V10 depicted in FIG. 5, and details which valves are opened during the various cycles of the pressure swing adsorption process. These cycles are effectuated by the intermittent opening and closing of valves V1 through V10, and the actuation of the valves for specified periods of time (exemplified but not limited to those in Tables 1–4) is usually controlled by a programmable logic controller (not shown).

Although the entirety of the pressure swing process is described in Table 1, the first portion of the process will be described for purposes of illustration. As shown in Table 1, when the second tower 14 is undergoing the ozone adsorption cycle, the first tower 13 is undergoing the oxygen purge cycle. To perform these cycles, valves V2, V3, V5, V6, and V10 are open for a selected period of time, for example, 0.25 minutes. As a result, part of the ozone-rich oxygen supply 16 is directed via valve V2 to the second tower 14.

The ozone adsorption bed of the second tower 14 adsorbs ozone from the ozone-rich oxygen supply 16. The ozone-depleted oxygen supply 20 exits the second tower 14, and is subsequently divided. A first part of the ozone-depleted oxygen supply 20 is directed to a first buffer tank 80 via valve V10, and is eventually recycled to the ozone generator 11. A second part of the ozone-depleted oxygen supply 20 is directed to the first tower 13 via valves V5 and V6.

During the oxygen purge cycle, the second part of the ozone-depleted oxygen supply 20 passes through the first tower 13. Subsequently, the second part of the ozone-depleted oxygen supply 20, and any contaminants collected during the oxygen purge cycle, are directed to a second buffer tank 81. The second buffer tank 81 reduces the pressure fluctuations of gas supplies received therein. Furthermore, the second buffer tank 81 may also be used to reduce ozone concentration fluctuations. The gas supplies received in the second buffer tank 81 are eventually directed to the ozone utilization application, for example, a drinking water disinfection system. At the expiration of the oxygen purge cycle in the first tower 13, the pressure swing adsorption process continues according to Table 1.

As discussed hereinabove, the adsorption beds of the first tower 13 and second tower 14 operate out of phase with one another. Such operation increases the efficiency of the process, by allowing the operation of one tower to complement the operation of the other tower. For example, the out of phase operation of the two tower PSA plant 12, allows the ozone-depleted oxygen supply 20 exiting one tower to be used in the oxygen purge cycle of the other tower.

Figure 6:
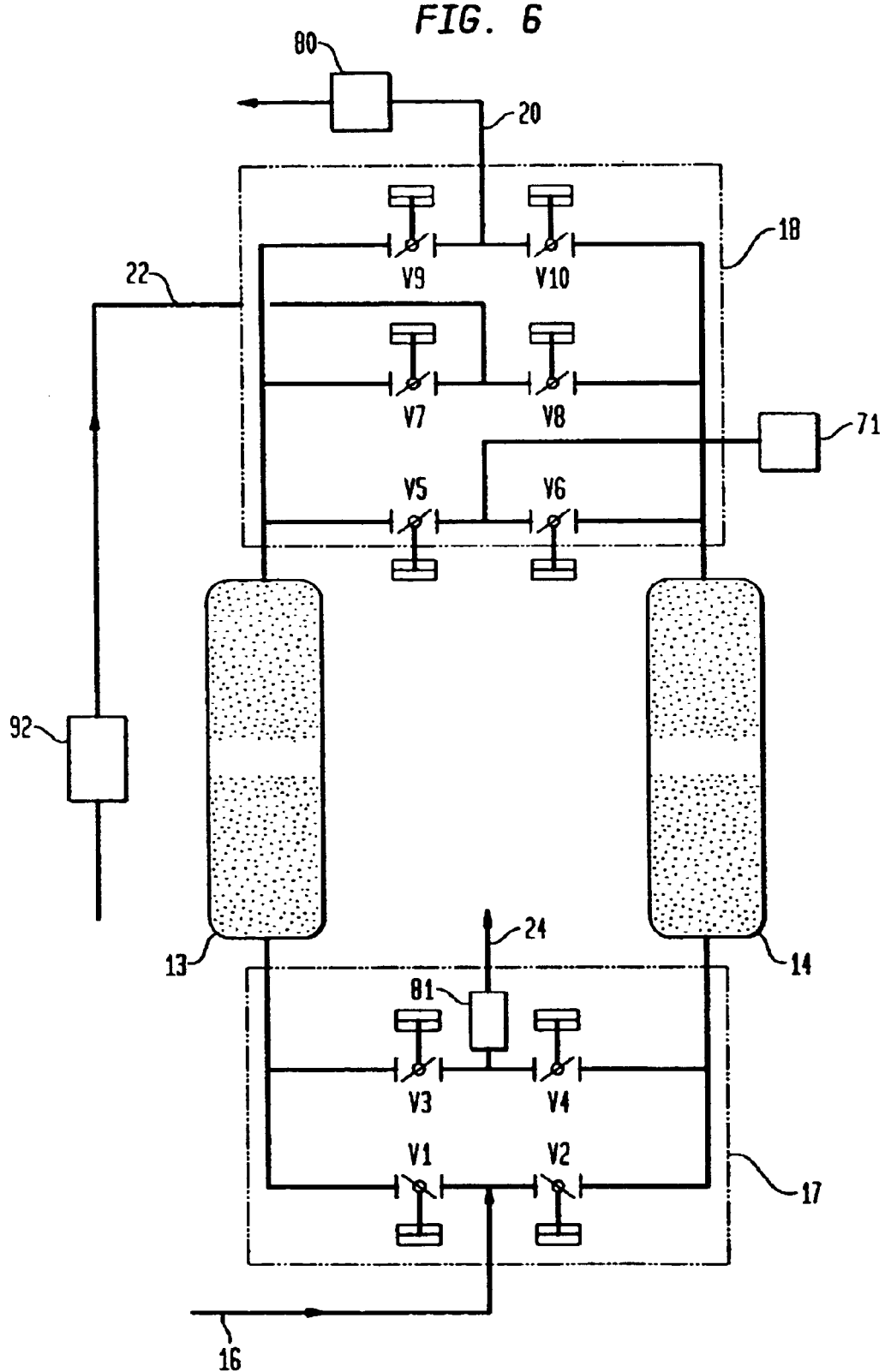
FIG. 6 is a schematic representation of an improvement to the two tower pressure swing adsorption plant.

However, as seen in FIG. 6, the efficiency of the pressure swing adsorption process can be increased by using a high purity oxygen supply 71, rather than the ozone-depleted oxygen supply 20 during the oxygen purge and pressurization cycles. High purity oxygen supply 71 could be oxygen from a liquid oxygen tank or gaseous oxygen from a cryogenic oxygen generator such as oxygen supply 15 in FIGS. 2 and 3. When the ozone-depleted oxygen supply 20 is recycled, this eventually results in an unacceptably large inerts concentration (more than 30%) in the ozone-depleted oxygen supply 20 eventually directed to the ozone generator 11. For purposes of this specification, nitrogen and argon in air are considered inerts. The presence of such inerts can reduce the efficiency of the ozone generator 11 by more than 20%. However, the high purity oxygen supply 71 reduces the inerts concentration to less than about 5% in the ozone-depleted oxygen supply 20 directed to the ozone generator 11. Such a concentration of nitrogen will have little effect on the efficiency of the ozone generator 11. The improved pressure swing adsorption process using the high purity oxygen supply 71, rather than the ozone-depleted oxygen supply 20, is described in Table 2.

TABLE 2

| Bed of First Tower 13 | Bed of Second Tower 14 | Valves Open | Time (minutes) |
| --- | --- | --- | --- |
| Oxygen purge using high purity oxygen supply 71 | Ozone adsorption | V2, V3, V5, V10 | 0.25 |
| Pressurization with high purity oxygen supply 71 | Ozone adsorption | V2, V5, V10 | 0.25 |
| Ozone adsorption | Purge using waste gas 22 | V1, V4, V8, V9 | 4.5 |
| Ozone adsorption | Oxygen purge using high purity oxygen supply 71 | V1, V4, V6, V9 | 0.25 |

TABLE 2-continued

| Bed of First Tower 13 | Bed of Second Tower 14 | Valves Open | Time (minutes) |
| --- | --- | --- | --- |
| Ozone adsorption | Pressurization with high purity oxygen supply 71 | V1, V6, V9 | 0.25 |
| Purge using waste gas 22 | Ozone adsorption | V2, V3, V7, V10 | 4.5 |

During the feed of the ozone-rich oxygen supply 16 to the adsorption beds of the first tower 13 and second tower 14, ozone is adsorbed on the adsorption beds and oxygen passes through. During desorption using the waste gas supply 22, ozone is desorbed from the adsorption beds and mixed with the waste gas supply 22. The resulting supply mixture 24 of ozone and waste gas supply 22 is collected in the second buffer tank 81 before being sent to ozone utilization applications such as drinking water treatment. During desorption the concentration of ozone in the supply mixture 24 exiting the adsorption beds is not constant and can vary by a factor of two or more. The pressures and flow rates of the supply mixture 24 coming out of the adsorption beds may also vary. The second buffer tank 81 mixes the supply mixture 24 to provide a nearly constant ozone concentration and flow rate to the ozone utilization application. The required size of the ozone buffer tank can be determined experimentally or through process simulation.

The efficiency of the process can also be increased by reducing the size of the second buffer tank 81. Because gas supplies are not directed to the second buffer tank 81 from either the first tower 13 or second tower 14 during their respective pressurization cycles as shown in Table 2, there are large pressure and concentration fluctuations in the second buffer tank 81. To overcome these fluctuations, the size of the second buffer tank 81 must be increased significantly. However, large buffer tanks as compared to small buffer tanks increase the possibility of ozone decomposition, and as a result, decrease the efficiency of the process. Also large, ozone compatible buffer tanks, can be fairly expensive. If the backfill step is eliminated the size of the ozone buffer tank can be reduced by 50% or more since there is constant ozone flow to the ozone buffer.

To keep the size of the second buffer tank 81 small, the second buffer tank 81 has to receive a constant supply of gas containing ozone. Replacing the process described in Table 2 with the process described in Table 3 will provide such a constant supply of gas containing ozone.

TABLE 3

| Bed of First Tower 13 | Bed of Second Tower 14 | Valves Open | Time (minutes) |
| --- | --- | --- | --- |
| Oxygen purge using fresh high purity oxygen supply 71 | Ozone adsorption | V2, V3, V5, V10 | 0.25 |
| Feed pressurization with high purity oxygen supply 71 and ozone adsorption | Waste gas purge | V1, V4, V8, V9 | 0.25 |
| Ozone adsorption | Waste gas purge | V1, V4, V8, V9 | 4.5 |
| Ozone adsorption | Oxygen purge using fresh high purity oxygen supply 71 | V1, V4, V6, V9 | 0.25 |

TABLE 3-continued

| Bed of First Tower 13 | Bed of Second Tower 14 | Valves Open | Time (minutes) |
|---|---|---|---|
| Waste gas purge | Feed pressurization with high purity oxygen supply 71 and ozone adsorption | V2, V3, V7, V10 | 0.25 |
| Waste gas purge | Ozone adsorption | V2, V3, V7, V10 | 4.5 |

During the feed pressurization cycles shown in Table 3, the first tower 13 and second tower 14 will receive the ozone-rich oxygen supply 16 initially for pressurization and then for ozone adsorption and production of the ozone-depleted oxygen supply 20. Therefore, the first tower 13 and second tower 14 are effectively pressurized without the need for the pressurization cycle of Table 2. Furthermore, during the process shown in Table 3 when one tower is undergoing the feed pressurization and ozone adsorption cycle, the other tower is undergoing either the waste gas purge cycle or oxygen purge cycle, and a constant supply of gas containing ozone is consequently supplied to the second buffer tank 81.

The cycle in Table 3 will reduce the size and corresponding cost of the second buffer tank 81. It will also reduce ozone decomposition inside the second buffer tank 81 through reduction in ozone residence time in the second buffer tank 81. In addition to the process described in Table 3, other possibilities exist to reduce or eliminate the second buffer tank 81. For example, if the ozone production plant 10 is used to treat large drinking or waste water supplies, then large basins for contacting ozone and water can themselves act as an ozone buffer to remove the aforementioned concentration fluctuations, and eliminate or substantially reduce the size of the second buffer tank 81.

The efficiency of the process can further be increased by warming the waste gas supply 22 used during the waste gas purge cycle. As discussed above, compressed dry air supply 34, 52 and nitrogen supply 44 are used as the waste gas supply 22 to desorb the ozone from the adsorption beds. Warming the waste gas supply 22 to about 10° C. to about 30° C. above the ozone-rich oxygen supply 16, for at least part of the waste gas purge cycle, reduces the amount of waste gas supply 22 required. Furthermore, warming the waste gas supply 22 also allows use of higher pressures during the waste gas purge cycle than afforded during the desorption with waste gas supply 22 having temperatures similar to ozone-depleted supply 16. As a result, a heater 92 may be provided as shown in FIG. 6 to heat the waste gas supply 22. Furthermore, the heat of compression generated during the production of compressed dry air supply 34, 52 can be used to heat the waste gas supply 22 when the compressed dry air supply 34, 52 is generated. A representative cycle using the warmed waste gas supply 22 is described in Table 4.

TABLE 4

| Bed of First Tower 13 | Bed of Second Tower 14 | Valves Open | Time (minutes) |
|---|---|---|---|
| Oxygen purge using high purity oxygen supply 71 | Ozone adsorption | V2, V3, V5, V10 | 0.25 |
| Pressurization with high purity oxygen supply 71 | Ozone adsorption | V2, V5, V10 | 0.25 |
| Ozone adsorption | Warm waste gas purge | V1, V4, V8, V9 | 2 |
| Ozone adsorption | Waste gas purge | V1, V4, V8, V9 | 2.5 |
| Ozone adsorption | Oxygen purge using high purity oxygen supply 71 | V1, V4, V6, V9 | 0.25 |
| Ozone adsorption | Pressurization with high purity oxygen supply 71 | V1, V6, V9 | 0.25 |
| Warm waste gas purge | Ozone adsorption | V2, V4, V8, V10 | 2 |
| Waste gas purge | Ozone adsorption | V2, V4, V8, V10 | 2.5 |

The efficiency of the process can still further be increased by using a wet waste gas supply 22 during the waste gas purge cycle. Such a wet regeneration gas can be produced by compressing ambient air to the desorption pressure. Using wet waste gas supply 22 during the gas purge cycle results in some loss in adsorption capacity. However, overall ozone recovery may increase because ozone destruction (or decomposition) decreases significantly when using wet adsorbents. Also, significant energy savings can be realized by only drying the ozone-depleted oxygen supply 20 before entering the ozone generator 11. As a result, the ozone-depleted oxygen supply 20 should be dried by some suitable drying process before going to the ozone generator 11. These drying processes include, but are not limited to, PSA, TSA, or a suitable membrane. In fact, the amount of moisture in the oxygen supply 15 may be less than 10% of the moisture in the waste gas supply 22 and this results in significant regeneration energy savings.

Figure 7:
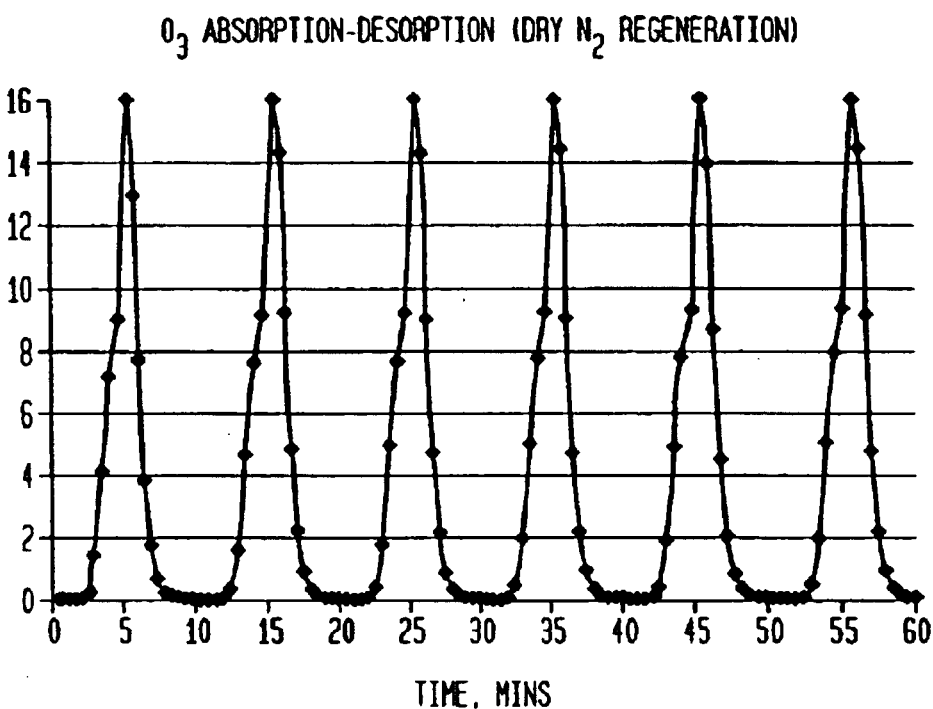
FIG. 7 is a graph showing the experimental results of ozone adsorption-desorption using dry nitrogen during the waste gas purge cycle.
Figure 8:
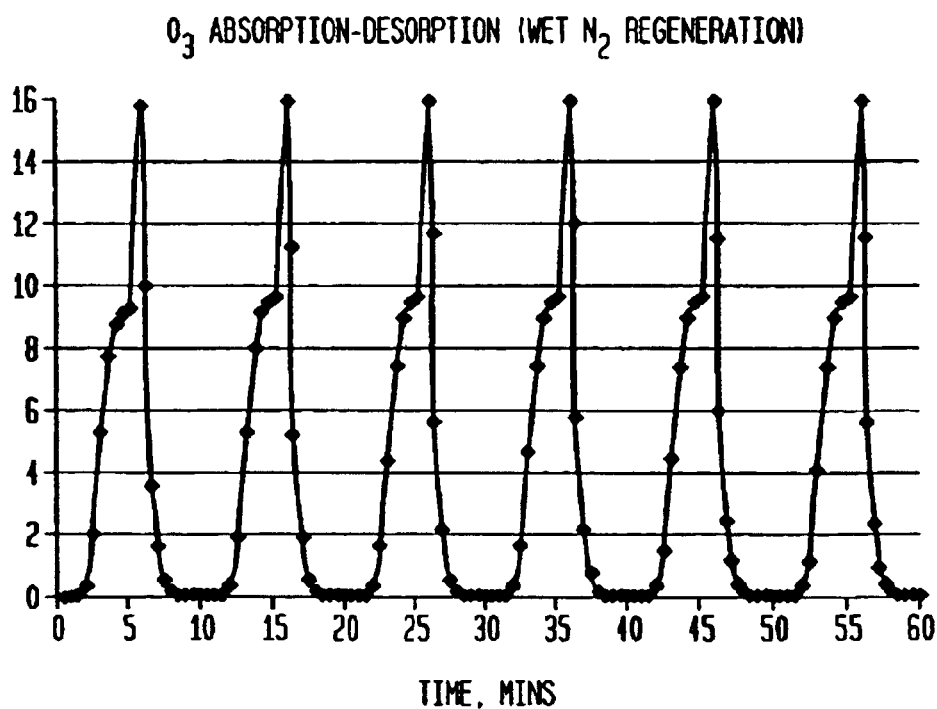
FIG. 8 is a graph showing the experimental results of ozone adsorption-desorption using wet nitrogen during the waste gas purge cycle.

The results of an experiment alternately using wet and dry nitrogen supplies 44 as the waste gas supply 22 are seen in FIGS. 7 and 8. For example, ozone from the ozone-rich oxygen supply 16 (10% ozone in oxygen mixture) was adsorbed on an adsorption bed composed of silica gel for approximately 5 minutes. The adsorbed ozone was subsequently desorbed using wet and dry nitrogen supplies 44 for 5 minutes. The flow rates of the ozone-rich oxygen supply 16 and the wet and dry nitrogen supplies 44 were identical. The ozone concentrations at the outlet of the adsorption bed during cyclic adsorption and desorption are shown in FIGS. 7 and 8. Comparison of the resulting ozone concentrations indicates that the adsorption capacity using a wet or dry nitrogen supply 44 are not significantly different.

Use of the wet waste gas supply 22 during regeneration makes possible the use of other adsorbents such as high silica mordenites and dealuminated Y zeolites. These adsorbents have ozone adsorption capacities two to three times that of silica gel. However, they can not be used when the adsorbent is dry because of significant ozone loss due to decomposition.

It will be understood that the embodiments described herein are merely exemplary and that a person skilled in the art may make many variations and modifications without departing from spirit and scope of the invention. The various embodiments may be practiced in the alternative, or in combination, as appropriate. All such modifications and variations are intended to be included within the scope of the invention as defined in the appended claims.

I claim:

1. A method of providing ozone at a selected pressure above atmospheric pressure comprising:

supplying a purge gas supply pressurized above the selected pressure to at least one ozone adsorption apparatus;

desorbing ozone from said ozone adsorption apparatus with said pressurized purge gas supply; and delivering a mixture of said ozone and said purge gas supply at the selected pressure without further compression.

2. The method according to claim 1 wherein the pressurized purge gas supply supplied to at least one ozone adsorption apparatus is selected from the group consisting of a compressed dry air supply and a nitrogen supply.

3. The method according to claim 1 further comprising:

compressing a supply of air to provide a compressed air supply;

supplying said compressed air supply to an oxygen generator; and, generating an oxygen supply with said oxygen generator.

4. The method according to claim 3 wherein said oxygen generator generating said oxygen supply comprises at least one dryer bed and at least one nitrogen adsorbing bed arranged in series.

5. The method according to claim 4 wherein a compressed dry air supply exits said dryer bed, and a first part of said compressed dry air supply is directed to said nitrogen adsorbing bed and a second part of said compressed dry air supply becomes said pressurized purge gas supply.

6. The method according to claim 3 wherein said oxygen generator generating said oxygen supply comprises at least one air prepurification unit and a cryogenic unit arranged in series.

7. The method according to claim 6 wherein said air prepurification unit removes contaminants from said compressed air supply to form a purified compressed air supply exiting said air prepurification unit, and said purified compressed air supply is directed to said cryogenic unit.

8. The method according to claim 7 wherein said cryogenic unit separates said purified compressed air supply into said oxygen supply and a nitrogen supply, and said nitrogen supply becomes said pressurized purge gas supply.

9. The method according to claim 3 wherein said oxygen generator generating said oxygen supply comprises at least one dryer bed, at least one air prepurification unit, and a cryogenic unit arranged in series.

10. The method according to claim 9 wherein a compressed dry air supply exits said dryer bed, and a first part of said compressed dry air supply is directed to said air prepurification unit and a second part of said compressed dry air supply becomes said pressurized purge gas supply.

11. The method according to claim 10 wherein a dry purified compressed air supply exits said air prepurification unit, and said dry purified air supply is directed to said cryogenic unit.

12. The method according to claim 11 wherein said cryogenic unit at least partially separates said dry purified compressed air supply into said oxygen supply and a nitrogen supply.

13. The method according to claim 3 further comprising:

directing said oxygen supply to an ozone generator; and generating an ozone-rich oxygen supply using said ozone generator.

14. The method according to claim 13 further comprising:

directing said ozone-rich oxygen supply to said at least one ozone adsorption apparatus;

adsorbing ozone from said ozone-rich oxygen supply in said at least one ozone adsorption apparatus to form an ozone-depleted oxygen supply; and recycling the ozone-depleted oxygen supply to said ozone generator.

15. The method according to claim 14 further comprising:

mixing said ozone-depleted oxygen supply with a vaporized liquid oxygen supply having an elevated pressure to form a compressed mixed oxygen supply; and, directing the compressed mixed oxygen supply to said ozone generator.

16. The method according to claim 1 further comprising:

supplying said at least one ozone adsorption apparatus with a high purity oxygen supply;

purging said pressurized purge gas supply from said at least one ozone adsorption apparatus using said high purity oxygen supply; and pressurizing said at least one ozone adsorption apparatus with said high purity oxygen supply.

17. The method according to claim 1 further comprising:

warming said pressurized purge gas supply before entering said at least one ozone adsorption apparatus.

18. The method according to claim 1 including at least one of compressing ambient air to a desorption pressure above the selected pressure to provide the pressurized purge gas supply; and introducing said pressurized purge gas supply to desorb ozone from said ozone adsorption apparatus without first drying said pressurized purge gas supply.

19. The method according to claim 1 including directing an ozone-rich oxygen supply to at least a second ozone adsorption apparatus while desorbing ozone from said at least one ozone adsorption apparatus with said pressurized purge gas supply; to provide a constant supply of gas containing ozone.

20. A method of providing ozone at a selected pressure above atmospheric pressure comprising:

providing a supply of compressed dry air at a pressure above the selected pressure;

diverting a first portion of said compressed dry air supply to an oxygen generator;

generating an oxygen supply with said oxygen generator;

directing said oxygen supply to an ozone generator;

generating an ozone-rich oxygen supply with said ozone generator;

passing said ozone-rich oxygen supply through at least one pressure swing adsorption tower;

adsorbing ozone from said ozone-rich oxygen supply in said pressure swing adsorption tower, to provide an ozone-depleted oxygen supply;

recycling the ozone-depleted oxygen supply to said ozone generator;

diverting a second portion of said compressed dry air supply to said pressure swing adsorption tower;

desorbing said ozone from said pressure swing adsorption tower using said second portion of said compressed dry air supply; and delivering a mixture of said ozone from said pressure swing adsorption tower and said second portion of said compressed air supply at the selected pressure without further compression.

* * * * *